Nov. 18, 1924.  
S. KRUSZYNSKI  
ANIMAL TRAP  
Filed June 13, 1923  
1,516,388  
4 Sheets-Sheet 1
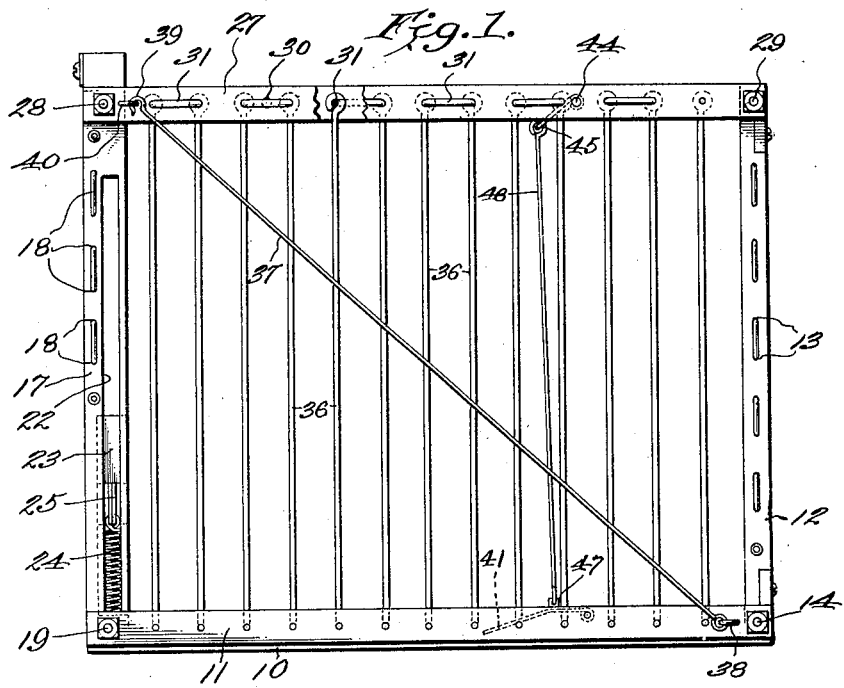
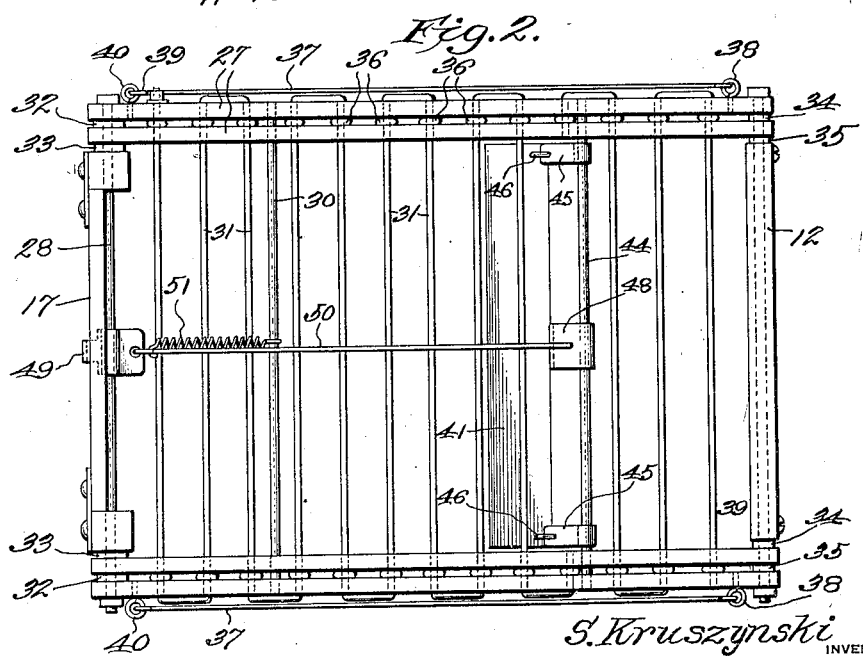
S. Kruszynski INVENTOR
BY Victor J. Evans ATTORNEY

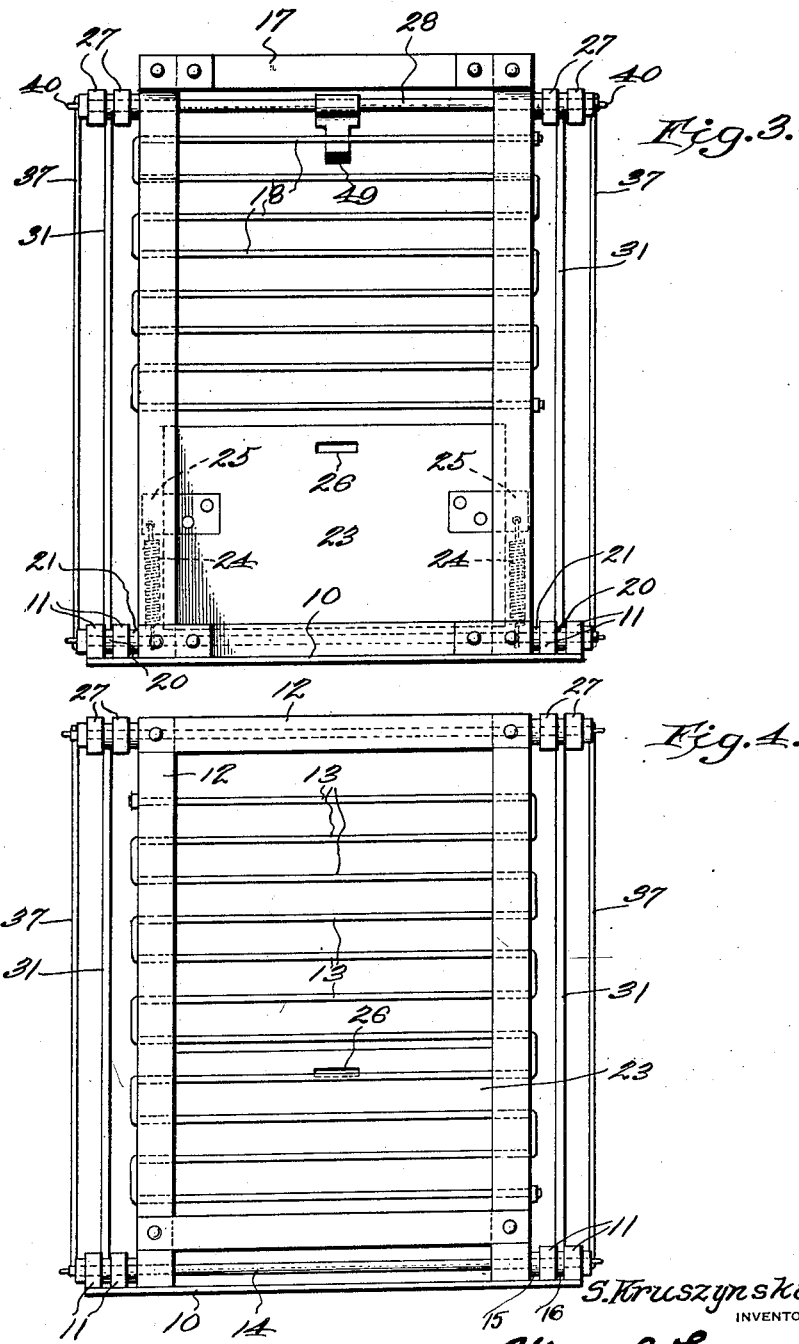

Nov. 18, 1924.                                      1,516,388
             S. KRUSZYNSKI
                ANIMAL TRAP
         Filed June 13 1923       4 Sheets-Sheet 3

S. Kruszynski,
INVENTOR
BY Victor J. Evans
ATTORNEY

Nov. 18, 1924.  S. KRUSZYNSKI  1,516,388
ANIMAL TRAP
Filed June 13, 1923   4 Sheets-Sheet 4
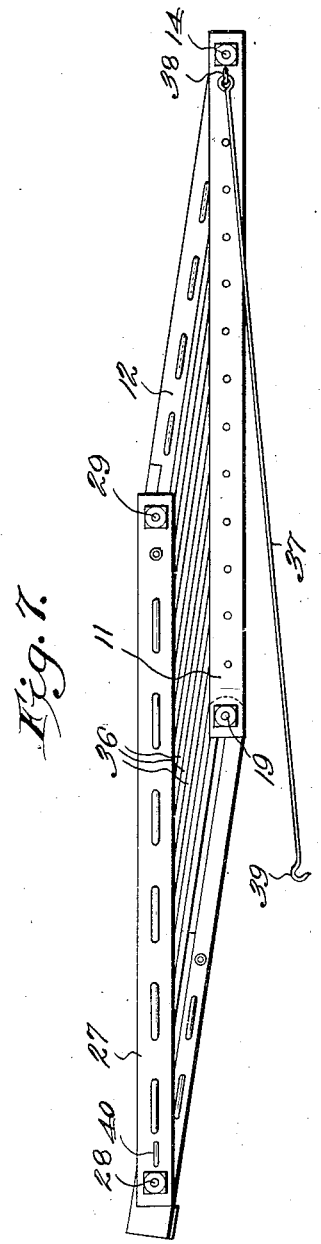
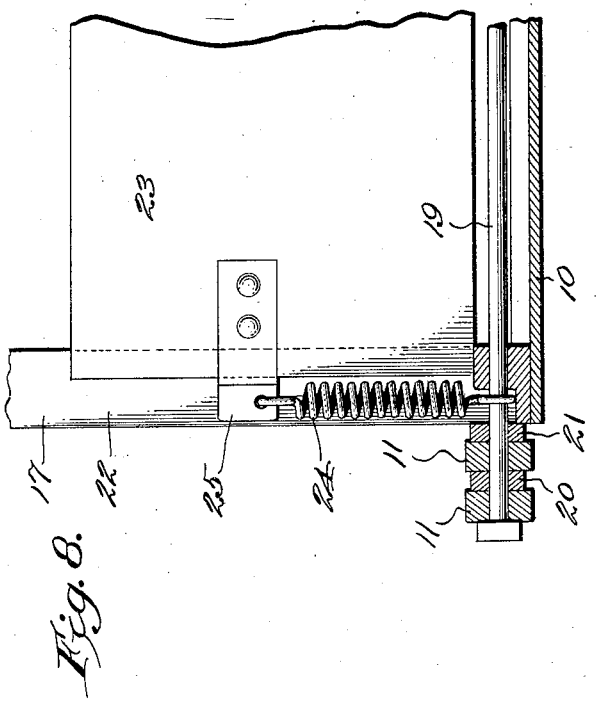
S. Kruszynski,
INVENTOR
BY Victor J. Evans
ATTORNEY Patented Nov. 18, 1924.

1,516,388

UNITED STATES PATENT OFFICE.

STENLY KRUSZYNSKI, OF PHILADELPHIA, PENNSYLVANIA.

ANIMAL TRAP.

Application filed June 13, 1923. Serial No. 645,213.

*To all whom it may concern:*

Be it known that I, STENLY KRUSZYNSKI, a citizen of the Republic of Poland, residing at Philadelphia, in the county of Philadelphia and State of Pennsylvania, have invented new and useful Improvements in Animal Traps, of which the following is a specification.

This invention relates to animal traps and has for its object the provision of a novel trap for catching animals of all kinds and sizes without injury to the animal so that the animal may be preserved for captivity if such is desired, or so that in case of fur bearing animals there will be no injury to the skins thereof.

An important object is the provision of a trap of this character which is collapsible so as to occupy comparatively small space for convenience in transportation or storage, the device being provided with peculiar brace means for holding it in step-up or rigid condition while in use.

Another object is the provision of a trap of this character which includes a peculiar treadle released trigger mechanism for holding it set and ready for instant operation upon slight depression of the treadle.

An additional object is the provision of a trap of this character which will be simple and inexpensive to manufacture, highly efficient in use, positive in action, durable in service and a general improvement in the art.

With the above and other objects and advantages in view the invention consists in the details of construction to be hereinafter more fully described and claimed and illustrated in the accompanying drawings, in which:

Figure 1 is a side elevation of the trap in set-up position,

Figure 2 is a top plan view,

Figure 3 is a front elevation,

Figure 4 is a rear elevation,

Figure 7 is a side elevation showing the trap folded,

Figure 8 is a detail section showing the spring mechanism for the door.

Figure 5:
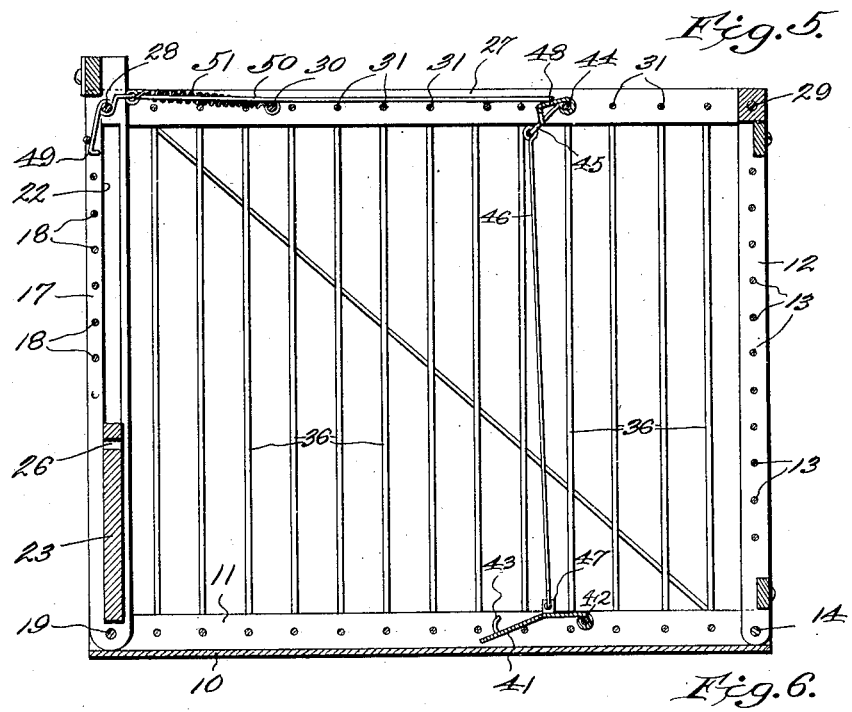
Figure 5 is a vertical longitudinal section.
Figure 6:
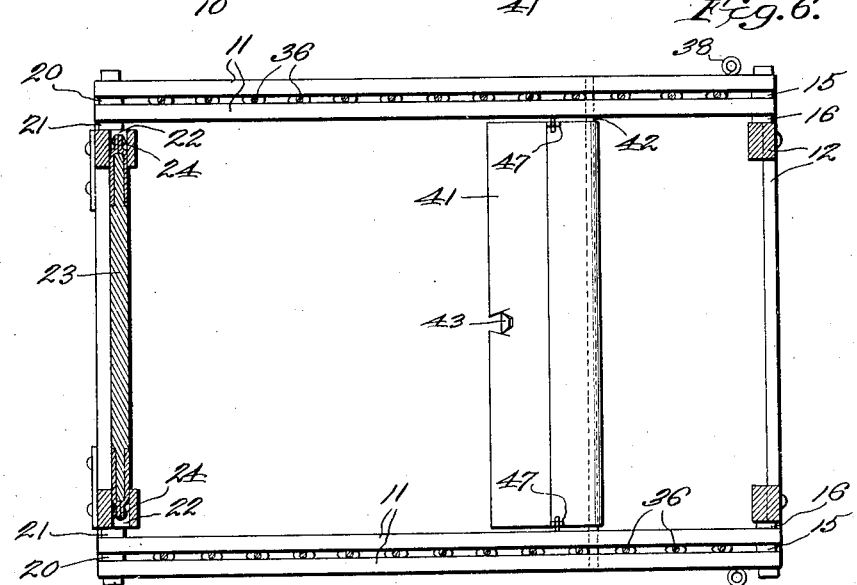
Figure 6 is a horizontal section showing a top plan view of the bottom.

Referring more particularly to the drawings I have shown the trap as comprising a bottom 10 which is preferably constructed of metal though some other material may be employed if preferred. Secured at the side edges of this bottom are pairs of bars 11. Located between the pairs of bars 11 at one end thereof is one end member which comprises a frame 12 including bars or wires 13 which extend horizontally as shown or which may be arranged vertically if preferred. This end member is pivotally mounted by an elongated rod 14 which extends through both pairs of bars 11. It is to be noted that spacers 15 are provided on this rod for holding the bars 11 of each pair spaced apart, and that other spacers 16 are provided for the purpose of holding the end member slightly spaced from both pairs of bars 11 to permit freedom of movement as will be hereinafter described.

The other end member, which is really the front, includes a frame 17 at the upper portion of which are horizontal bars or wires 18 but which has its lower portion open to constitute a door-way for the entrance of animals. This front member is pivoted on a rod 19 which passes through the other ends of both pairs of bars 11, and the rod 19 is equipped with spacers 20 and 21 corresponding to the spacers 15 and 16 and for the same purpose. The sides of the frame of this front member are formed with vertical slots 22 within which is slidably mounted the door 23 for closing the opening, which door is normally forced downwardly by coil springs 24 located within the slots 22 and connected with the rod 19 and with extensions 25 on the side edges of the door. At its upper edge the door is formed with an elongated slot 26.

The top of the trap includes pairs of spaced bars 27 connected at the front and rear of the trap by transverse rods 28 and 29 respectively and connected also by an intermediate rod 30. The bars 27 are connected by bars or wires 31. The rod 28 passes through the upper portion of the front member 17 and carries spacers 32 and 33, the former of which are located between the bars 27 and the latter of which are located between the frame 17 and the innermost ones of the pairs of bars 27. In a similar manner the rear rod 29 passes through the rear frame 12 and carries spacers 34 and 35 arranged in the same manner as the spacers 32 and 33.

To form the sides of the trap I provide upright rods or bars 36 which are pivoted between the pairs of bars 11 and 27. By this construction it will be seen that the entire enclosure is freely collapsible into the position shown in Figure 7, the various pivotal connections permitting this action. For holding the device in its set-up condition to define a rectangular enclosure, I provide elongated braces 37 which are permanently pivotally connected at their lower ends upon the pairs of bars 19 shown at 38 and which have their other ends terminating in hooks 39 engageable within keepers 40 on the upper pairs of bars 27. The device cannot be collapsed until these braces are disengaged from their keepers.

Located somewhat above the bottom 10 is a transversely disposed treadle 41 pivoted on a rod 42 which extends between the pairs of bars 11 and this treadle is equipped with a suitable hook 43 or the like for the purpose of retaining any suitable bait thereon. Journaled between the upper pairs of bars 27 is a rock shaft 44 provided with arms 45 with which are pivotally connected links 46 which are in turn pivotally connected with ears 47 on the treadle. At its central portion this rock shaft carries a trigger member 48. Pivoted on the central portion of the rod 28 is a trigger 49 of a hook like nature engageable within the slot 26 in the door for holding the door elevated against the resistance of the springs 24. Connected with the trigger 49 is a rod 50 which extends rearwardly and which co-operates with the trigger 48. Also connected with the trigger 49 is a spring 51 which extends rearwardly and which is connected with the intermediate rod 30, the purpose of this spring being to urge the trigger 49 into its released position and to urge the rod 50 rearwardly.

To set the trap the door is raised and the trigger 49 is engaged within the slot 26, bait is placed upon the treadle and the treadle is raised so that the rod 50 may have its end abuttingly engaged with the end of the trigger member 48. When an animal enters the trap and disturbs the treadle, the links 46 cause the rock shaft 44 to rock so that the trigger 48 is rocked down out of engagement with the rod 50 so that the spring 51 may operate, whereupon the trigger 49 is disengaged from the slot 26 and the door is slammed down by the springs 24. It is of course apparent that when the trigger 48 moves downwardly the rod 50 is moved rearwardly and extends across the top of the trigger member 48. In this way the animal is imprisoned and will furthermore be retained alive which is of material advantage in case of fur bearing animals and also in case of trapping animals for supplying zoological parks and the like. The folding feature has already been described and need not be repeated but it is to be observed that it is advantageous inasmuch as it makes the device more convenient for transportation or storage.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. A trap of the character described comprising a bottom, back and front members pivotally connected therewith, a top pivotally connected with the front and back members, vertical rods extending between and pivotally connected with the top and bottom to form the sides, diagonal braces for connecting the top and bottom to hold the device in set-up position, the front member being formed with a door opening, a downwardly spring pressed door slidable within the front member for covering said opening, a treadle pivoted above the bottom, and a trigger mechanism engaging the door and connected with said treadle for releasing the door upon depression of the treadle.

2. A trap of the character described comprising a bottom, back and front members pivotally connected therewith, a top pivotally connected with the front and back members, vertical rods extending between and pivotally connected with the top and bottom to form the sides, diagonal braces for connecting the top and bottom to hold the device in set-up position, the front member being formed with a door opening, a downwardly spring pressed door slidable within the front member for covering said opening, the door being formed with a slot, a treadle pivoted above the bottom, and a trigger mechanism engaging the door and connected with said treadle for releasing the door upon depression of the treadle, said trigger mechanism including a rock shaft having crank arms connected with the treadle, a trigger on the rock shaft, a hook like trigger member pivoted at the top of the front member and engageable with said slot, a spring normally urging said second named trigger into releasing position and a rod connected with the second named trigger and engaging the first named trigger for holding said second named trigger in operative position.

3. In a trap including an enclosure, a door mounted for vertical sliding movement in front of the enclosure, springs urging said door downwardly, the door being formed with a slot, a pivoted treadle, a rock shaft connected with the treadle and carrying a trigger, a hook like trigger pivoted on the front and engageable within the slot in the door, a spring normally urging said second named trigger into released position, and a longitudinally movable rod pivotally connected with said second named trigger and engaging the first named trigger for holding the trap set.

In testimony whereof I affix my signature.

STENLY KRUSZYNSKI.